Oct. 27, 1970 J. M. NOONAN ET AL 3,536,838

AMPLIFIER WITH VOICE- AND LINE-SWITCHED GAIN CONTROLS IN NEGATIVE FEEDBACK PATH

Filed Oct. 1, 1968 2 Sheets-Sheet 1

INVENTORS
J. M. NOONAN
P. O. SCHUH
BY Charles E. Graves
ATTORNEY

AMPLIFIER WITH VOICE- AND LINE-SWITCHED GAIN CONTROLS IN NEGATIVE FEEDBACK PATH

Filed Oct. 1, 1968 2 Sheets-Sheet 2

3,536,838

AMPLIFIER WITH VOICE- AND LINE-SWITCHED GAIN CONTROLS IN NEGATIVE FEEDBACK PATH

John M. Noonan and Peter O. Schuh, Indianapolis, Ind., assignors to Bell Telephone Laboratories, Incorporated, Murray Hill and Berkeley Heights, N.J., a corporation of New York Filed Oct. 1, 1968, Ser. No. 764,187
Int. Cl. H03g 3/20
U.S. Cl. 179—1 8 Claims

ABSTRACT OF THE DISCLOSURE

This is an electronic amplifier intended primarily for head telephone sets, that incorporates an automatic bias adjustment and a negative feedback loop with two independent controls. The bias adjustment allows the amplifier to operate linearly over a wide range of DC currents in the line to which an amplifier is connected. The negative feedback loop consists of a voice-switched gain responsive to normal speech level but not normal background noise, and also a line-switched gain which reduces amplification in response to line current level. The voiced switching threshold is held at a constant level regardless of the line current and the amplifier's automatic bias adjustment.

FIELD OF THE INVENTION

This invention is concerned with electronic amplifiers and, in particular, involves a universal amplifier for use in substantially all head telephone sets which employ microphones other than the carbon transmitter.

BACKGROUND OF THE INVENTION

Head telephone sets are used in the telephone plant principally by central office operators and PBX attendants. Their work situations have in common an appreciable level of background noise which in the interest of clear transmission must be suppressed. The carbon transmitter used in the past is inherently unresponsive to most background noise. Where other type microphones are used to lighten the set's weight, background noise must be electronically attenuated. Frequently also, amplification of the speech signals received by the microphone is also necessary.

In the suppression of background noise, it is convenient to use the anticipated operator speech levels to automatically control the gain of the amplifier. One such voice-switching expedient is taught in Pat. 3,368,158 of W. J. Brown, assigned to applicants' assignee where a headset amplifier discriminates on an instantaneous amplitude basis. While attractive for its simplicity, the device in some situations introduces a degree of distortion. Needed is an amplifier that discriminates on an average amplitude basis to avoid the problem of distortion, and yet which retains the virtue of simplicity.

Realizing this type of voice-switched gain in a particular amplifier, however, is complicated by the widely differing circuits into which the amplifiers must operate. For example, current available to the amplifier varies from about 3 milliamperes in some locations to over 130 milliamperes in others. If the headset microphone amplifier is to be usable universally regardless of the available current, some characteristic of the circuit which the amplifier feeds must be automatically sensed; and in response thereto, the gain of the amplifier must be adjusted to ensure linear operation within a current range appropriate to the circuit conditions. And yet, under all conditions, the voice-switched gain threshold must be held constant.

Accordingly, one broad object of the invention is to realize in a single amplifier the functional capabilities of voice-switched gain control, and automatic gain adjustment depending upon the specific value of a working circuit parameter.

A specific object of this invention is to achieve linear operation of a telephone transmitter amplifier while maintaining a constant threshold of voice-switched gain control, under widely varying line circuit DC current levels.

Another object of the invention is to electrically discriminate against operator position background noise without introducing distortion into normal voice amplification.

SUMMARY OF THE INVENTION

These and other objects are achieved pursuant to the invention by combining in an amplifier a negative feedback loop, dually controlled by a voice-switched feedback network ($\beta_S$) and by an independent line-switched feedback network ($\beta_L$). As is well known in the art the symbol $\beta$ is used to denote the feedback factor; refer to Electronic Engineering, Ally and Atwood; Wiley, 2nd ed., 1966, p. 438. Associated with the loop is a first network for adjusting the amplifier gain in accordance with the available current in the line circuit into which the amplifier works and a second network which causes the gain of the voice-switch amplifier to vary inversely with the gain of the headset amplifier thus keeping the voice-switching threshold at a preselected constant level.

The line-switched $\beta$ control is derived from a circuit which detects the level of line current. With values of line current greater than a set amount, part of the main amplifier feedback is shunted out, causing the amplifier gain to increase. Control of the voice-switched $\beta$ is achieved by feeding a portion of the main amplifier output into a second amplifier, rectifying and filtering it, and then causing it to operate on another portion of the main amplifier feedback. With but normal background noise, this circuit does not alter the primary feedback which holds the gain low enough to attenuate the noise. But with inputs above a certain value, taken to be the level of normal close-up speech, the voice-switched $\beta$ is reduced to allow normal gain for anticipated speech levels.

Pursuant to one facet of this invention, regardless of the current in the line circuit in which the amplifier is used, the switching threshold of the voice-switched $\beta$ is maintained at a predetermined level corresponding, for example, to a pressure of about 75 dbt at the tip of a headset speech tube. Significantly, the voice-switching threshold is kept independent of the amplifier gain adjust.

In one specific inventive embodiment, the voice-switched gain comes into play only after the passage of a predetermined span of time. In this fashion, the thumping sound resulting from too fast a turn-on as well as the speech clipping resulting from too slow a turn-on are avoided. Further, the voice-switched gain is held between speech syllables to prevent any speech break-up.

Accordingly, one feature of the invention is an amplifier with a circuit that senses the current available for its powering, and adjusts the amplifier bias to increase amplifier voltage as a function of increasing load current.

Another feature of the invention involves separate voice-switched gain and line-switched gain controls operating in a cascaded negative feedback circuit to adjust amplifier gain automatically in accordance both with the current available in the line circuit and the input signal level.

The invention, its further objects, features and advantages will be fully apprehended from a reading of the following detailed description of an illustrative embodiment in conjunction with the accompanying drawings.

DETAILED DESCRIPTION OF AN ILLUSTRATIVE EMBODIMENT

Overall structure

The invention is described hereinafter in an embodiment involving a telephone operator's headset. Numerous other environments will readily come to mind, however; in which the invention can find use.

Figure 1:
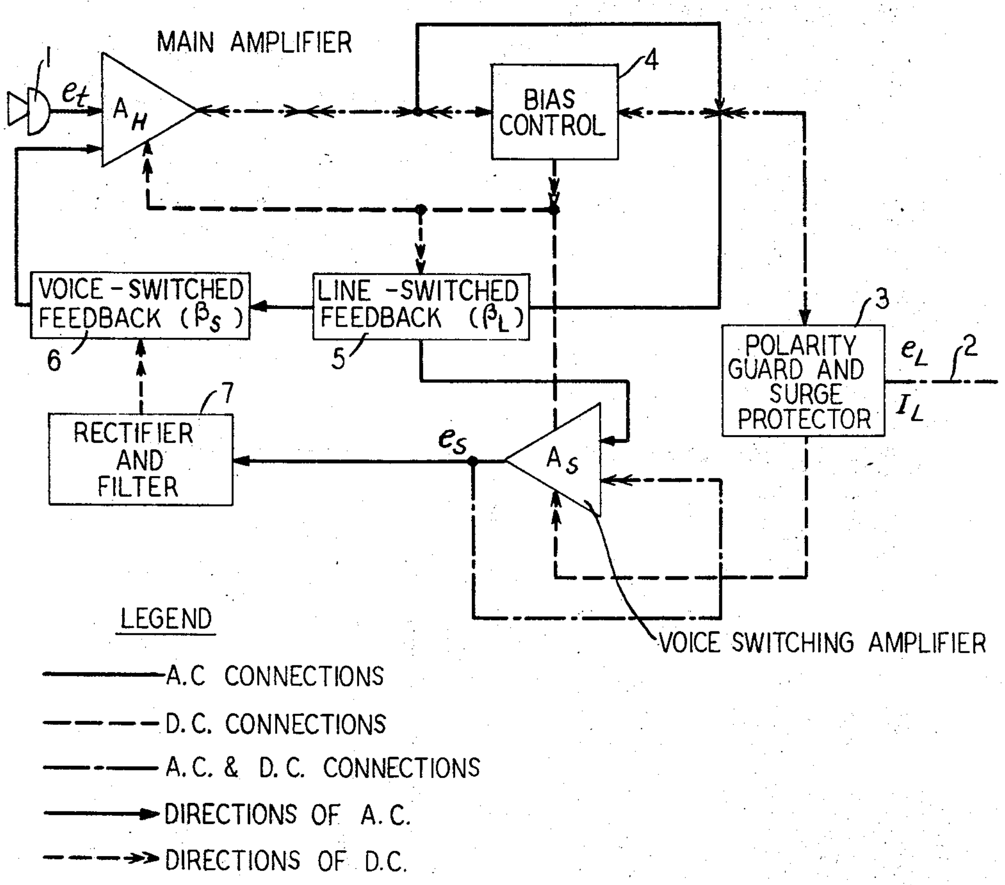
FIG. 1 is a functional circuit diagram in block form depicting the overall operation of the invention.

The block diagram of FIG. 1 represents an overall amplifier system embodying the present invention. The legend associated with FIG. 1 distinguishes the connections between the various components as being solely AC, solely DC or both AC and DC; and also distinguishes the direction of AC and the direction of DC. The symbols using in connection with FIG. 1 and in the specification to follow have the following meanings:

$e_t$=AC voltage from transmitter unit 1
$e_L$=AC voltage delivered to line 2
$e_S$=AC voltage delivered to rectifier and filter 5
$I_L$=DC current available at line 2
$A_H$=Headset amplifier
$A_S$=Voice-switching amplifier
$\beta_L$=Line-switched feedback
$\beta_S$=Voice-switched feedback The amplifier system consists of headset microphone 1 connected to a headset amplifier $A_H$. The output of amplifier $A_H$ is applied to a telephone line designated 2 through a polarity guard and surge protector 3. DC power is available at line 2, but in widely varying amounts from case to case.

Amplifier $A_H$ receives DC bias from a bias control 4 which monitors the line current and adjusts the bias accordingly. The AC output of amplifier $A_H$ by-passes bias control 4 and is applied to line 2 through polarity guard 3.

Figure 3:
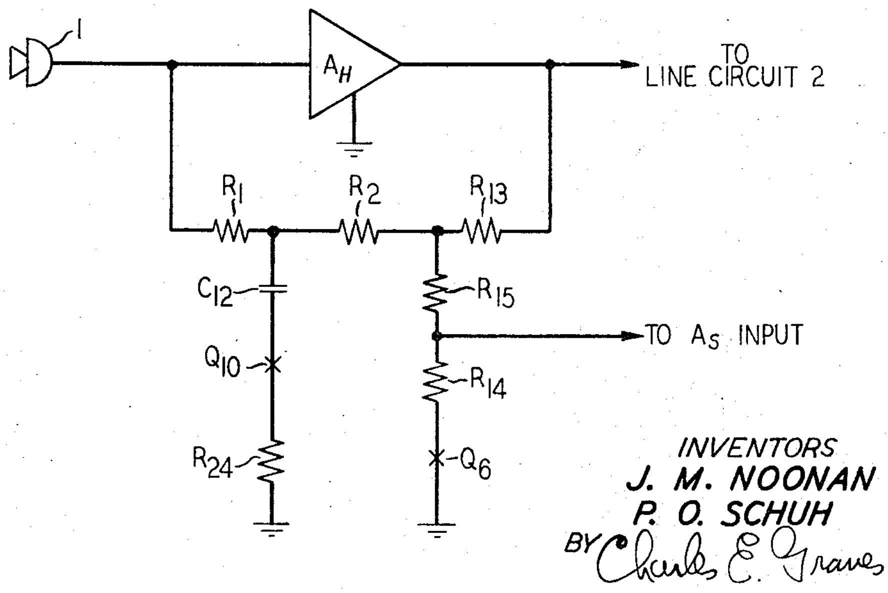
FIG. 3 is a circuit schematic diagram depicting the feedback control paths.
Figure 2:
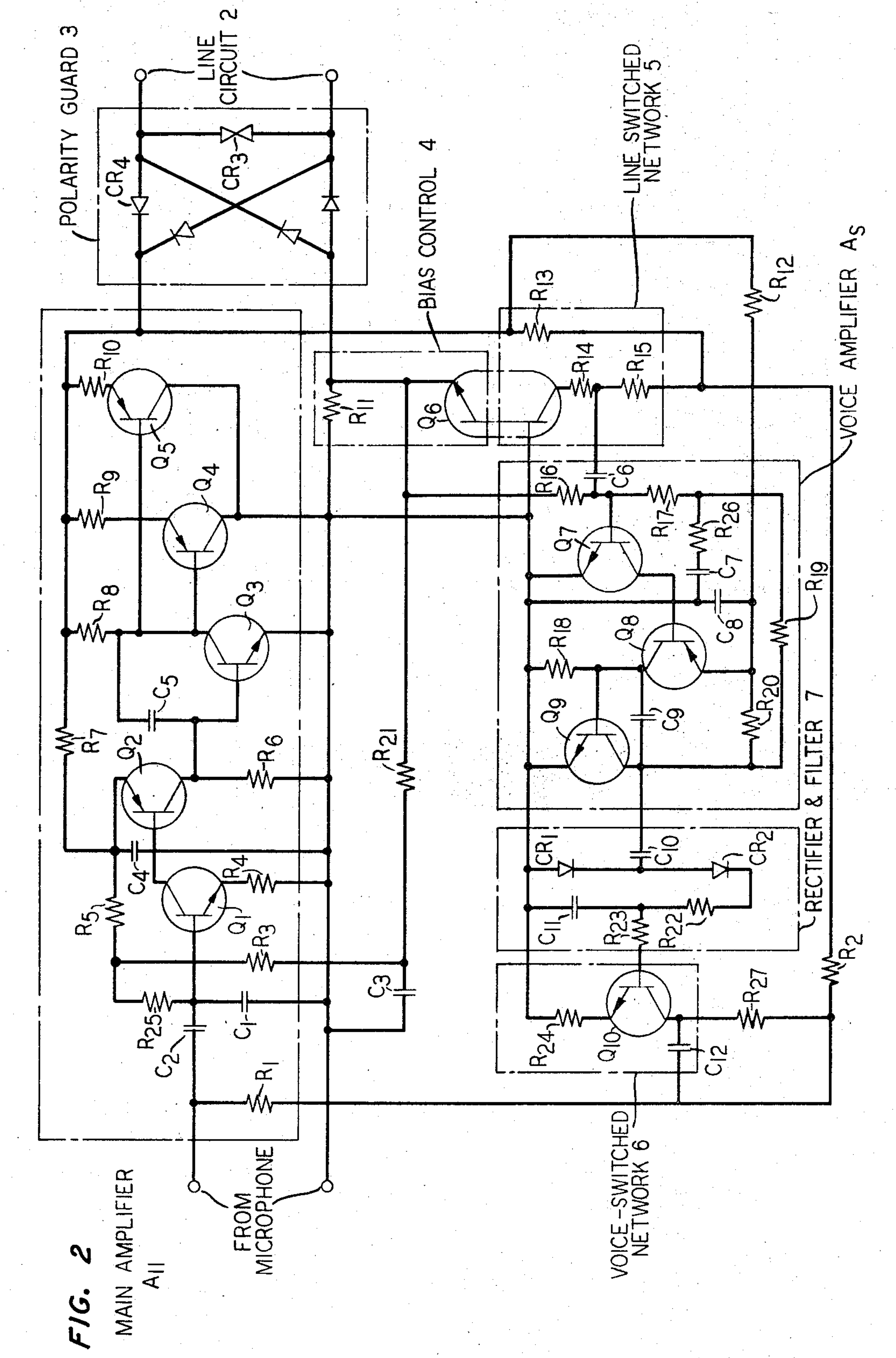
FIG. 2 is a circuit schematic diagram of one circuit which practices the invention.

As shown in FIGS. 1, 2, and 3, a portion of this output is applied to a cascaded negative feedback loop consist- of a line-switched network 5 and input-switched network 6, which in the present invention is voice-switched. Network 5 derives a DC control input from the bias control loop linking bias control 4 with amplifier $A_H$. Network 5 serves to reduce the feedback of amplifier $A_H$ with line circuit currents above a set level, thus increasing the gain.

A portion of the output signal $e_L$ is applied to amplifier $A_S$ thru network 5. Amplifier $A_S$ amplifies this signal to a level sufficient for rectification in the rectifier and filter circuit 7. The rectifier signal is applied then to network 6 where it serves to reduce the negative feedback when the speech input to microphone 1 is over a certain value. Importantly, network 5 is included as part of the switching signal path in order to keep the voice-switching threshold independent of the gain $e_L/e_t$.

DETAILED CIRCUIT STRUCTURE

Headset amplifier

A specific circuit configuration which practices the invention is shown in FIG. 2. The headset amplifier $A_H$ is a four-stage, direct coupled amplifier consisting of transistors $Q_1$, $Q_2$, $Q_3$, $Q_4$, and $Q_5$. Power is derived from the line current 2 to which amplifier $A_H$ is connected. The amplifier $A_H$ must handle up to 130 milliamperes of current, most of which must pass through the output stages $Q_4$ and $Q_5$. The latter hence are connected in parallel to dissipate this high power when it occurs; and emitter resistors $R_9$ and $R_{10}$ of transistors $Q_4$ and $Q_5$ are of low but sufficient value to provide equal current division between the two transistors. The AC output signal $e_L$ is decoupled from transistors $Q_1$ and $Q_2$ by a loop consisting of resistor $R_7$ and capacitor $C_4$. Capacitor $C_1$ provides high frequency attenuation to achieve the proper response characteristic for voice frequency inputs.

Capacitor $C_3$ and resistor $R_{21}$, acts as a decoupling circuit to prevent the output signal developed across $R_{11}$ from being fed back to the base of $Q_1$. Resistors $R_3$, $R_4$, $R_5$, $R_{21}$, and $R_{25}$ are used to bias amplifier $A_H$ with resistor $R_{25}$ being employed to raise the input impedance of the amplifier. Resistor $R_6$ acts as a load resistor for transistor $Q_2$ while capacitor $C_2$ acts as a coupling capacitor to isolate the DC resistance of the microphone 1 from the amplifier $A_H$. Capacitor $C_5$ provides additional high frequency attenuation.

Bias adjust

For amplifier $A_H$ to operate linearly on currents ranging from 3 to 130 milliamperes, the bias to transistors $Q_1$–$Q_5$ is, pursuant to the invention, adjusted according to the amount of current available. The bias control 4 consists essentially of resistor $R_{11}$ and the emitter-to-base resistance of transistor $Q_6$ which functions in the line-switched network 5 in a manner to be described. Resistor $R_{11}$ is connected in series with the base bias resistors $R_3$, and $R_{21}$, of amplifier $A_H$ and the base bias resistor $R_{16}$ of switch amplifier $A_S$. The voltage drop occurs across resistor $R_{11}$ varies with the DC line current $I_L$. Accordingly, the voltage drop between circuit common and the base of transistors $Q_1$ and $Q_7$ is increased, thus causing these transistors to conduct more current. Similarly, if $I_L$ is a lower value the base voltage of transistors $Q_1$ and $Q_7$ is reduced resulting in less collector current.

Line-switched gain

The operator headset of the present embodiment might be used in a PBX circuit which already includes an amplifier, thus negating the need for some of the gain provided by amplifier $A_H$. The feedback network 5 shown in FIGS. 1 and 2 provides the line-switched gain, $\beta_L$ to enable the over amplifier system of the present invention to adapt to this type circuit. To this end, network 5 detects $I_L$, the DC current available at line circuit 2.

The specific control of $\beta_L$ is derived through resistor $R_{13}$ and the shunt path consisting of resistor $R_{14}$, $R_{15}$ and the collector-to-emitter resistance of transistor $Q_6$. The voltage drop across resistor $R_{11}$, which as earlier described forms part of the bias adjust feature of the invention, is also used to control the on-off state of transistor $Q_6$.

When the amplifier $A_H$ feeds into a PBX circuit, $I_L$ will be less than, say, 30 milliamperes. There will be an insufficient voltage drop across resistor $R_{11}$ to cause it to turn on transistor $Q_6$. Therefore, the overall feedback loop for amplifier $A_H$ includes resistors $R_{13}$, $R_2$ and $R_1$. When $I_L$ is greater than, say, 40 milliamperes as occurs if the line circuit 2 is an operator's cord circuit, the emitter-base junction of transistor $Q_6$ becomes saturated and the collector resistance approaches zero. Therefore, the feedback signal is shunted by the path consisting of resistors $R_{14}$ and $R_{15}$ and the internal resistance of transistor $Q_6$. This shunting causes the gain of amplifier $A_H$ to be increased by a predetermined amount.

Voice-switched gain

The feedback network 6 shown in FIGS. 1 and 2 provides the voice-switched gain, $\beta_S$ for amplifier $A_H$. Network 6 consists of a first path comprising series resistors $R_1$ and $R_2$, which is shunted when required by the path comprising capacitor $C_{12}$, resistor $R_{24}$ and the collector-to emitter resistance of transistor $Q_{10}$.

The mode of transistor $Q_{10}$ is controlled by the level of a DC voltage developed in the rectifier-filter circuit consisting of capacitors $C_{10}$, $C_{11}$, diodes $CR_1$, $CR_2$, and resistors $R_{22}$, $R_{23}$. The signal applied to this circuit is obtained from voice-switching amplifier $A_S$ which, it will be recalled, derives its input as a portion of the output of amplifier $A_H$. In FIG. 2, amplifier $A_S$ is shown as a three-stage direct-coupled amplifier consisting of transistors $Q_7$, $Q_8$, $Q_9$ and their associated resistors $R_{16}$, $R_{17}$, $R_{18}$, $R_{19}$, $R_{20}$, and $R_{26}$, and capacitors $C_6$, $C_7$, and $C_9$. Power for amplifier $A_S$ is derived from the line circuit 2 through a resistor $R_{12}$. Capacitor $C_8$ decouples the output voltage $e_L$ from amplifier $A_S$. A conventional AC and DC feedback circuit from the collector of transistor $Q_9$ to the base of $Q_7$ through resistors $R_{17}$ and $R_{19}$ stabilizes the DC bias and AC gain of amplifier $A_S$. The gain of amplifier $A_S$ is adjusted by varying the value of resistor $R_{26}$ which limits the decoupling obtained from capacitor $C_7$. Resistor $R_{26}$ could, of course advantageously be a potentiometer.

Operation

The basic system requirements for the operator's headset through which the invention is being illustrated are principally two-fold. The headset amplifier $A_H$ must operate linearly into either an unamplified operator's cord circuit or a PBX circuit which utilizes a telephone set network and its own amplifier. Then, the amplifier must attenuate background noise below a certain level.

The presence of the amplifier in a PBX circuit, however, reduces the gain required from amplifier $A_H$. As noted, this reduction is achieved by varying the feedback $\beta_L$ of network 5 which detects the line circuit current.

The voice-switching of the gain of amplifier $A_H$ is achieved by coupling a portion of the output signal $e_L$ into amplifier $A_S$, rectifying and filtering the output and feeding to network 6. If the resulting DC voltage is sufficient to turn on transistor $Q_{10}$, the feedback loop for amplifier $A_H$ is shunted by a path consisting of capacitor $C_{12}$, transistor $Q_{10}$ and resistor $R_{24}$. The negative feedback thus is reduced, and the gain $e_L/e_t$ is increased. Advantageously, resistors $R_2$ and $R_{24}$ are chosen in the instant embodiment to produce a gain increase for $e_L/e_t$ of about 10 db.

Voice-switching threshold

The voice-switched gain provides normal gain for anticipated operator speech levels and otherwise attenuates background noise and adjacent operator pick-up. Advantageously, the voice-switching threshold is chosen to correspond to about 75 dbt at the speech tube tip. This characteristic must obtain regardless of the circuit into which the amplifier operates. This in turn requires that the voice-switching threshold be kept completely independent of the bias adjust feature earlier described, which effects the gain control of amplifier $A_H$.

Pursuant to the invention, this requirement is achieved by including the feedback network 7 as part of the switching signal path. Specifically, as seen in detail in FIG. 2, amplifier $A_S$ is connected to network 7 through capacitor $C_6$. It thus is seen that, as $\beta_L$ changes, the gains $e_L/e_t$ and $e_s/e_L$ vary inversely with respect to each other.

This assures that the switching gain $e_s/e_t$ which fixes the voice-switching threshold, is constant and independent of $\beta_L$.

Too fast or too slow a turn-on of transistor $Q_{10}$ which would cause thumping in the output of amplifier $A_H$, is avoided by proper choice of charge time on $C_{11}$ which is controlled by $R_{22}$. Also, to ensure that $Q_{10}$ remains on between speech syllables, the discharge time of $C_{11}$ advantageously is 250 milliseconds.

The flexibility of the present amplifying circuitry extends beyond its ability to operate into circuits with widely varying current supplies. It is also readily possible to adjust the critical gains and switching thresholds.

For example, by varying the value of resistor $R_{26}$ the gain of amplifier $A_S$ is adjusted which would turn on transistor $Q_{10}$ at a different speech threshold. Also, the negative feedback controlling the voice-switched gain is determined by the ratio $R_2/R_{24}$, provided the resistance of resistor $R_{24}$ is substantially larger than the collector resistance of transistor $Q_{10}$. Furthermore, the line-switching threshold is fixed by the choice of transistor $Q_6$ and the value of resistor $R_{11}$.

The negative feedback controlling the amount of line-switched gain is determined by selecting appropriate values for resistors $R_{13}$, $R_{14}$ and $R_{15}$. Additionally, as is apparent from FIG. 3, the values of resistors $R_1$ and $R_2$ in the feedback path of amplifier $A_H$ determine the maximum feedback level. Those resistive components whose chosen values fix the aforementioned operating points can be provided as potentiometers or step resistances, for example, if desired.

Component values and data with which to achieve the desired operation of the above-described circuit when applied to an operator's headset microphone amplifier are listed below, where resistances are in ohms and capacitances are in microfarads.

| | |
|---|---|
| $R_1$=75K | $R_{21}$=10K |
| $R_2$=75K | $R_{22}$=10K |
| $R_3$=10K | $R_{23}$=39K |
| $R_4$=2.7K | $R_{24}$=3K |
| $R_5$=39K | $R_{25}$=10K |
| $R_6$=2.7K | $R_{26}$=51 |
| $R_7$=1.0K | $R_{27}$=120K |
| $R_8$=3.0K | $C_1$=.01 |
| $R_9$=6.2 | $C_2$=1.0 |
| $R_{10}$=6.2 | $C_3$=1.0 |
| $R_{11}$=18 | $C_4$=22.0 |
| $R_{12}$=240 | $C_5$=.001 |
| $R_{13}$=2K | $C_6$=.33 |
| $R_{14}$=240 | $C_7$=22.0 |
| $R_{15}$=750 | $C_8$=22.0 |
| $R_{16}$=33K | $C_9$=.003 |
| $R_{17}$=6.8K | $C_{10}$=1.0 |
| $R_{18}$=2.7K | $C_{11}$=1.0 |
| $R_{19}$=10K | $C_{12}$=1.0 |
| $R_{20}$=2K | |

$CR_1$, $CR_2$=silicon rectifier diode
$CR_3$=silicon symmetrical surge protecting diode
$CR_4$=germanium full wave bridge
$Q_1$=low noise NPN silicon transistor
$Q_2$, $Q_4$, $Q_5$, $Q_8$=PNP silicon transistor
$Q_3$, $Q_6$, $Q_7$, $Q_9$, $Q_{10}$=NPN silicon transistor It is to be understood that the embodiments described herein are merely illustrative of the principles of the invention. Various modifications may be made thereto by persons skilled in the art without departing from the spirit and scope of the invention.

What is claimed is:

1. An amplification circuit for a telephone set comprising:
- an amplifier with a negative feedback loop, input connectors from a microphone, and output connectors to a line circuit;
- means sensing the line current level for adjusting the amplifier bias level to maintain linearity;
- means responsive to recorded speech signals above a predetermined level for applying a first shunt path to a portion of said feedback loop; and
- means responsive to sensing of line current above a set level for applying a second shunt path to a portion of said feedback loop.

2. An amplifier circuit comprising:
- a main amplifier having an input and an output;
- a line circuit connecting to said main amplifier for receiving said output, said line circuit containing a DC current of varying level for powering said main amplifier;
- a negative feedback loop connected across said main amplifier and comprising 1st and 2nd serially connected networks;
- said first network having a line current-switched feedback factor and said second network having an input-switched feedback factor;

means connecting said first network to said line circuit and responsive to DC current levels therein above a specified level for effecting a control of said line current-switched feedback factor; and means connecting said second network to said main amplifier output and responsive to said output above a specified level for effecting a control of said input-switched feedback factor.

3. A voice frequency amplifier circuit comprising:

a main amplifier having a voice frequency input and output;

a line circuit containing DC current of varying level connected to said main amplifier for powering same and for receiving said output;

a negative feedback loop connected across said main amplifier and comprising 1st and 2nd serially connected networks, said first network comprising a line current-switched feedback factor and said second network comprising a voice input level-switched feedback factor;

means connecting said first network to said line circuit and responsive to DC current levels therein above a specified level for effecting a control of said line current-switched feedback factor;

means connecting said second network to said main amplifier output and responsive to said output above a specified level for effecting a control of said input-switched feedback factor; and means connected between said line circuit and said main amplifier responsive to DC line current level for controlling the gain of said main amplifier to keep the operating point thereof in the linear region.

4. An amplifier circuit in accordance with claim 3, wherein said first network comprises a first resistive element in series relation in said negative feedback loop and a shunting path comprising a first transistor switch, said path reducing the net feedback factor of said first network on closure of said first switch.

5. An amplifier circuit in accordance with claim 4, wherein said main amplifier gain control means comprises a resistive element connected in series relation with the biasing elements of said main amplifier, and wherein said first transistor switch is connected across said resistive element, current levels in said line circuit effecting the voltage drop across said resistive element, thereby to adjust said main amplifier gain and to control the mode of said first transistor switch.

6. An amplifier circuit in accordance with claim 5, wherein said second network connecting means comprises a second amplifier, means for coupling a portion of said main amplifier output signal thereinto for amplification sufficient to permit later rectification, and rectifying means; and wherein said second network comprises a first resistive element in series relation in said negative feedback loop and a shunting path comprising a second transistor switch and means connecting the output signal of said rectifying means to said second transistor switch to control the mode thereof for reducing of the net feedback factor of said second network on closure of said second switch.

7. An amplifier circuit in accordance with claim 6, wherein said means for coupling a portion of said main amplifier signal into said second amplifier comprises said first network, thereby to assure that the voice-switching threshold remains independent of the gain of said main amplifier.

8. An amplifier in accordance with claim 6, further comprising means for controlling the rate of turn-on of said second transistor switch and also means for maintaining said second transistor switch in its on-mode for a predetermined time after removal of the signal from said rectifying means.

No references cited.

KATHLEEN H. CLAFFY, Primary Examiner

J. B. LEAHEEY, Assistant Examiner